(12) United States Patent
Clifton et al.

(10) Patent No.: US 9,141,869 B2
(45) Date of Patent: Sep. 22, 2015

(54) METHOD OF IDENTIFYING ANOMALIES IN IMAGES

(75) Inventors: David Clifton, Dunfermline (GB); Craig Robertson, Dunfermline (GB)

(73) Assignee: Optos PLC, Dunfermline (GB)

( * ) Notice: Subject to any disclaimer, the term of this patent is extended or adjusted under 35 U.S.C. 154(b) by 183 days.

(21) Appl. No.: 13/990,534

(22) PCT Filed: Oct. 24, 2011

(86) PCT No.: PCT/GB2011/052061
§ 371 (c)(1),
(2), (4) Date: Jul. 30, 2013

(87) PCT Pub. No.: WO2012/072995
PCT Pub. Date: Jun. 7, 2012

(65) Prior Publication Data
US 2013/0301927 A1    Nov. 14, 2013

(30) Foreign Application Priority Data

Dec. 3, 2010   (GB) .................................. 1020530.0

(51) Int. Cl.
*G06K 9/46*    (2006.01)
*G06T 7/00*    (2006.01)
(Continued)

(52) U.S. Cl.
CPC . *G06K 9/46* (2013.01); *G06T 7/001* (2013.01); *G06T 7/003* (2013.01); *H04N 1/4097* (2013.01); *H04N 5/2171* (2013.01); *G06T 2207/30041* (2013.01); *G06T 2207/30168* (2013.01); *G06T 2207/30242* (2013.01)

(58) Field of Classification Search
CPC ...................................................... G06K 9/46

USPC ............................................................ 382/195
See application file for complete search history.

(56) References Cited

U.S. PATENT DOCUMENTS

| 5,218,648 A |   | 6/1993 | Wells et al. |
|---|---|---|---|
| 6,035,072 A | * | 3/2000 | Read ............................. 382/275 |

(Continued)

FOREIGN PATENT DOCUMENTS

| EP | 0 585 759 A1 | 3/1994 |
|---|---|---|
| WO | WO-99/01840 A1 | 1/1999 |
| WO | WO-2005/010510 A1 | 2/2005 |

OTHER PUBLICATIONS

Schreib, F., "International Search Report", for PCT/GB2011/052061, as mailed Feb. 9, 2012, 4 pages.

*Primary Examiner* — Stephen R Koziol
*Assistant Examiner* — Delomia Gilliard
(74) *Attorney, Agent, or Firm* — Winstead PC

(57) ABSTRACT

A method of identifying anomalies in images produced using an imaging device (70). The method comprises receiving (10), (12) first and second pluralities of candidate anomalies, the candidate anomalies being identified in subsequent images produced with an imaging device. A constellation match (14), (16), (18), (19) is carried out between the first and second pluralities of candidate anomalies to identify a correlation therebetween, represented by a constellation match value. A plurality of constellation match values is determined with a different relative x-y shift between the first and second pluralities of candidate images. If a good correlation is found at a particular x-y shift then the candidate anomalies are common between the first and second images, which is indicative of the first and second images including anomalies.

18 Claims, 5 Drawing Sheets

(a)

(b)

(51) Int. Cl.
  *H04N 1/409* (2006.01)
  *H04N 5/217* (2011.01)

(56) References Cited

U.S. PATENT DOCUMENTS

| | | |
|---|---|---|
| 6,233,364 B1 | 5/2001 | Krainiouk et al. |
| 2005/0018899 A1 | 1/2005 | Elyasaf et al. |
| 2005/0068446 A1 | 3/2005 | Steinberg et al. |
| 2006/0242706 A1* | 10/2006 | Ross .............................. 726/23 |
| 2009/0209833 A1* | 8/2009 | Waagen et al. .............. 600/306 |
| 2010/0067781 A1 | 3/2010 | Huet et al. |
| 2011/0052068 A1* | 3/2011 | Cobb et al. .................... 382/190 |

* cited by examiner

METHOD OF IDENTIFYING ANOMALIES IN IMAGES

TECHNICAL FIELD

The invention relates to a method and apparatus for identifying anomalies in images produced by an imaging device.

BACKGROUND

Images produced using imaging devices may contain anomalies that are not representative of the image that was intended to be captured by the imaging device. That is, due to various reasons, images may include features that are not present in the real world image.

Causes of the anomalies may include, for example: contaminants in an imaging device such as dust that has settled on a lens, mirror or other equipment; irregularities in a mirror, lens or other equipment used in an imaging device; and/or image processing errors associate with the algorithms used in image production. The anomalies may reoccur in successive images produced using an imaging device.

For the avoidance of doubt it is noted that the term "anomaly" as used herein encompasses anomalies that appear in an image that are imparted onto the image by the imaging device or system. In particular, anomalies may refer to anomalies due to dust settling within an imaging device, such as on a mirror or lens.

The remainder of this document refers to anomalies caused by contaminants. However the skilled person will be aware that the scope of the invention is intentionally intended to cover other anomalies as described above.

Contaminants such as dust are a particular problem in the field of retinal imaging scanners. The remainder of this document refers predominantly to retinal imaging scanners. However, the skilled person will understand that other imaging devices such as, for example, cameras, optical scanners scanning laser ophthalmoscopes, and the like, may also suffer from the same identified problem and that the method of the present invention may also be used to identify anomalies in images produced by these devices.

The appearance contaminants in a retinal image can be manifest in a form similar to pathology such as micro-aneurisms that the retinal imaging scanner may be attempting to identify. It is therefore desirable to maintain the optical surfaces of a retinal imaging scanner free of dust and other contaminants in order to avoid any ambiguity in the classification of certain image features and to maintain the general quality perception of images produced by the scanner.

Current known methods for maintaining optical surfaces free from contaminants include periodic maintenance whereby a retinal imaging device is cleaned by a trained engineer at regular intervals. In some cases the cleaning process is conducted too early and the optical surfaces may not have been in need of cleaning. In other cases the cleaning process is conducted too late and the optical surfaces may have been operating under sub-optimal conditions for a period of time.

Another known method for detecting dust is disclosed in US patent application 2005/0068446, which uses multiple images produced using a digital camera to generate a dust map. The dust map is compared to a history of previous dust maps generated from previous images. The method used to identify dust regions is based on searching for regions of common gradient variations. This approach is likely to be sensitive to noise. Additionally, it is not applicable in cases where spatial motion between images occurs, i.e. the method could not be used when the spatial position of an individual dust candidate is different between images.

SUMMARY

In accordance with the invention in a first aspect there is provided a method of identifying anomalies in images produced using an imaging device, the method comprising: identifying a plurality of anomalies from first and second pluralities of candidate anomalies, wherein the identified plurality of anomalies comprises at least two of the first plurality of candidate anomalies that have the same relative spatial arrangement as at least two of the second plurality of candidate anomalies, wherein the first plurality of candidate anomalies is identified in a first image produced using an imaging device, and wherein the second plurality of candidate anomalies is identified in a second image produced using the imaging device.

In exemplary embodiments of the invention, by using common relative spatial arrangements between the first and second pluralities of candidate anomalies the invention is able to identify the presence of anomalies in an image that are common to successive images, but which are spatially shifted between images. Exemplary embodiments of the invention identify anomalies as those candidate anomalies that have a common relative spatial arrangement in the first plurality of candidate anomalies and the second plurality of candidate anomalies. In this way, exemplary embodiments of the invention identify anomalies without using absolute position candidate anomalies.

Therefore, for the avoidance of doubt, the term "relative spatial arrangement" as used herein encompasses the relative coordinates of two or more anomalies within one of the first and second pluralities of candidate anomalies. That is, relative spatial arrangement may define the relative position of one candidate anomaly to one or more other candidate anomalies within a plurality of candidate anomalies.

In embodiments, the relative spatial arrangement of at least two candidate anomalies of the first plurality of candidate anomalies may be compared to the relative spatial arrangement of at least two candidate anomalies of the second plurality of candidate anomalies. If the relative spatial arrangements of the candidate anomalies in the first and second pluralities of candidate anomalies are substantially the same then the at least two candidate anomalies may be considered to be actual anomalies.

Exemplary embodiments of the invention allow a user of an imaging device to determine whether the operation of the imaging device is being compromised by anomalies caused by contaminant on optical surfaces of the device. These exemplary embodiments allow the user to call out an engineer to clean the optical surfaces at the time when they are required. This makes the maintenance and cleaning of the device more efficient.

Optionally, the imaging device may be a retinal imaging scanner or a scanning laser ophthalmoscope.

Optionally the relative spatial arrangement of the candidate anomalies comprises a distance from the centre of each candidate anomaly in the first or second plurality of candidate anomalies to the centre of all other candidate anomalies in the same plurality of candidate anomalies.

In exemplary embodiments of the invention, the distances between candidate anomalies are measured from the centre of each candidate anomaly to create a common reference point. That is, in exemplary embodiments of the invention, using the distance from the centre of each candidate anomaly a common reference point is used. In addition, distances measured from each candidate anomaly to the remaining candidate anomalies in a plurality of candidate anomalies means that, in some embodiments, the arrangement of the candidate anomalies is determined without reference to their absolute position.

Optionally, identifying a plurality of anomalies comprises running a constellation match between the first plurality of candidate anomalies and the second plurality of candidate anomalies.

In exemplary embodiments, a constellation match allows the relative position of each candidate anomaly in the first plurality of candidate anomalies to be compared with the relative position of each candidate anomaly in the second plurality of candidate anomalies.

Optionally, running the constellation match comprises correlating the first plurality of candidate anomalies with the second plurality of candidate anomalies and determining a constellation match value representing the level of correlation between the spatial arrangements of the first and second pluralities of candidate anomalies.

In exemplary embodiments, the constellation match value allows the quantification of how well the positions of the first plurality of candidate anomalies match the positions of the second plurality of candidate anomalies. Where more than one close match exists between candidate anomalies from the first and second pluralities of candidate anomalies then this may, in some embodiments of the invention, indicate that contaminants are present on the optical surfaces of a retinal image scanner.

Optionally, determining a constellation match value comprises measuring a plurality of distances from the centre of each candidate anomaly of the first plurality of candidate anomalies to the centre of each candidate anomaly of the second plurality of candidate anomalies and averaging the plurality of distances.

Optionally running the constellation match comprises determining a candidate count representing the number of candidate anomalies in the second plurality of candidate anomalies within a predetermined radius of each candidate anomaly of the first plurality of candidate anomalies.

In exemplary embodiments of the invention determining the candidate count can be used to determine the number of anomalies that are contained within an image. In some embodiments this may allow a user of an imaging device to determine a level of contaminant in the imaging device.

Optionally, the method may further comprise determining a plurality of constellation match values and a plurality of candidate counts, each constellation match value and candidate count being determined after shifting the first plurality of candidate anomalies in x and/or y directions relative to the second plurality of candidate anomalies.

In exemplary embodiments of the invention, by determining constellation match values after shifting the first plurality of candidate anomalies relative to the second plurality of candidate anomalies, the level of correlation between the two sets of candidate anomalies can be determined across a search area, expressed in x and y coordinates. This may account for any spatial shift in the anomalies caused by e.g. contaminants across the two images.

Optionally, the method may further comprise identifying a plurality of anomalies in the first and second images in dependence on one of the plurality of candidate counts being greater than a predetermined threshold.

If the level of correlation of one of the candidate counts is above a certain threshold then this may signify a correlation in the position of a number of candidate anomalies in the first plurality of candidate anomalies with corresponding candidate anomalies in the second plurality of candidate anomalies. The level of the candidate count may be indicative of the number of anomalies in an image caused by e.g. contaminants on optical surfaces of a retinal imaging scanner.

Optionally, the threshold is determined in dependence on the relative value of the plurality of candidate counts.

In exemplary embodiments of the invention, by determining the threshold based on the relative value of the plurality of candidate counts then the noise performance of the method is improved. In a high noise environment the absolute value of one or more candidate counts may be above a fixed threshold but this may not indicate a constellation match. However, if the threshold is set relative to all of the plurality of candidate counts then a particular candidate count must stand out against other candidate counts to identify the presence of anomalies.

Optionally, the method may further comprise identifying the first plurality of candidate anomalies in a first image produced using the imaging device and identifying the second plurality of candidate anomalies in a second image produced using the imaging device.

The applicant appreciates that the identification of the first and second plurality of candidate anomalies may be undertaken at the same place as the identification of anomalies from those candidate anomalies. However, for the avoidance of doubt it is noted that the applicant also understands that the identification of candidate anomalies may be undertaken elsewhere in other states or territories and passed to a remote location for identification of anomalies from the candidate anomalies. Carrying out the method of the invention on candidate anomalies identified elsewhere is intentionally within the scope of the invention.

Optionally, identifying the first and second pluralities of candidate images may comprise running a matched filter on each of the first and second images.

Optionally, running a matched filter may comprise correlating a representation of an anomaly to an area the first and/or second image and determining a correlation value representing the level of correlation therebetween.

In exemplary embodiments, by using a representation of an anomaly, a section of an image may be compared to the representation and a correlation value will give the level of correlation between the area of the image and the representation. A high level of correlation may indicate that an anomaly is present in the image.

Optionally, determining the correlation value may comprise determining the difference between an intensity level of at least one area of the representation of an anomaly and an intensity level of a corresponding overlaid area of the first and/or second image. The intensity level may for example be a light level.

In certain exemplary embodiments the representation may be split into areas, such as pixels, and the light level of each pixel of the representation may be compared to the light level of each corresponding pixel of the image. The correlation value may be the average of each difference.

Optionally, the method may further comprise identifying a candidate anomaly of the first and/or second pluralities of candidate anomalies in dependence on a correlation value being greater than a predetermined threshold.

Optionally, the method may further comprise determining a plurality of candidate anomalies by determining a plurality of correlation values, each correlation value being determined after shifting the representation of an anomaly in an x and/or y direction relative to the image.

In certain exemplary embodiments the candidate anomalies may be determined for all or part of an image. By shifting the representation in x and or y the representation may be slid across an image. Where the representation reaches an area of the image that has a high correlation to the representation then a high correlation value will be output by the filter thereby identifying candidate anomalies. This process may be termed a two dimensional convolution.

Optionally, the method may further comprise producing the first and second images using the imaging device.

The applicant appreciates that the production of the first and second plurality of the first and second images using the imaging machine may be undertaken at the same place as the identification of anomalies and/or the same place as the identification of candidate anomalies. However, for the avoidance of doubt it is noted that the applicant also understands that the production of the first and second images may be undertaken elsewhere in other states or territories and the images passed to a remote location for use in the method of the invention. Carrying out the method of the invention on images produced elsewhere is intentionally within the scope of the invention.

According to the invention in a second aspect there is provided a computer program product configured to store computer program code executable to carry out the method as described above.

According to the invention in a third aspect there is provided an apparatus comprising a processor configured to carry out the method as described above.

In an exemplary embodiment of the invention an imaging device may comprise the apparatus as described above. The imaging device may be a scanning laser ophthalmoscope.

DESCRIPTION

Exemplary embodiments of the invention will now be described with reference to the accompanying drawings, in which FIG. 1 shows a flow diagram of an exemplary embodiment of the invention;

In general, embodiments of the invention are related to an algorithm for the generation of a dust metric. In particular, embodiments of the invention describe a constellation match stage that enables noise tolerant discrimination between images contaminated by dust or other contaminants, and images which are clean.

The term "constellation match" as used herein encompasses any algorithm that correlates the spatial arrangement of two sets of features. That is, a constellation match looks for similarities between two constellations (e.g. first and second pluralities of candidate anomalies) to identify the level of match between the two. A constellation match may give a generalised level of the overall match between two constellations. Alternatively or in addition, a constellation match may identify particular features in a constellation of features that have a common spatial arrangement with corresponding features in another constellation.

Identification of anomalies in an image is achieved by identifying a plurality of candidate anomalies that may be caused by contamination particulates between two images. A number of the candidate anomalies may be noise or other image artefacts.

A 'constellation match' is then generated from the candidate anomalies. This may be used to produce a 2D search surface of distance measures representing the centre of mass of each candidate anomaly in a first plurality of anomalies to the centre of mass of each of a second plurality of candidate anomalies for a range of x-y relative image shifts. This is explained in greater detail below.

Figure 1:
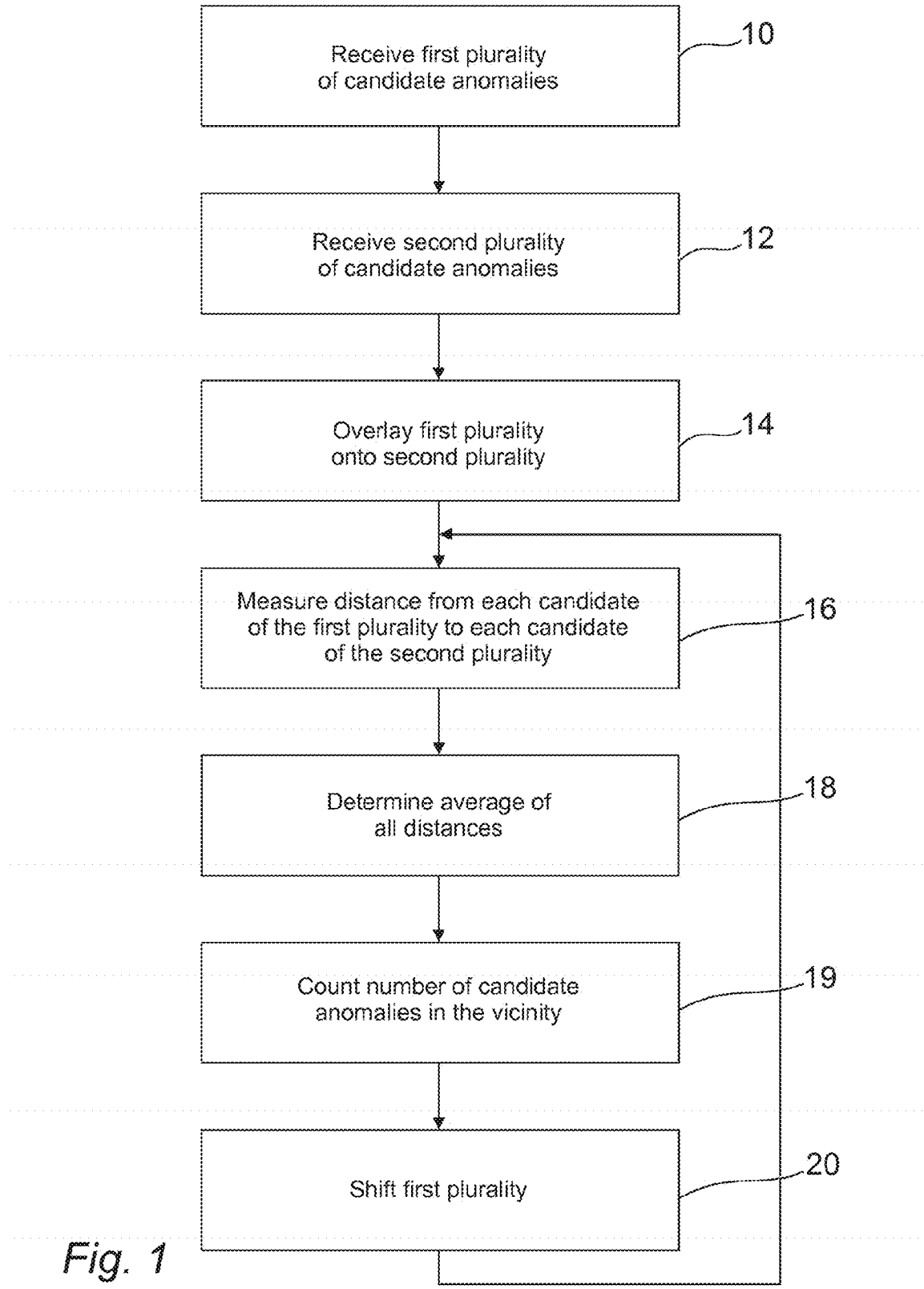

Referring to FIG. 1 there is shown a method of a specific exemplary embodiment of the present disclosure.

In exemplary embodiments of the present disclosure, first and second pluralities of candidate anomalies are received 10, 12. As described above, the pluralities of candidate anomalies may be identified elsewhere and delivered to a local site where the invention may be carried out. For example, the candidate anomalies may be identified in a remote region, state or territory and uploaded to a local server. The invention may be executed on a microprocessor that is able to retrieve and/or receive the pluralities of candidate anomalies from the local server.

At step 14 the first plurality of candidate anomalies is overlaid on top of the second plurality of candidate anomalies. The term overlaid is used figuratively to give the reader an impression of the processes involved in the invention. However, in exemplary embodiments disclosed herein the first and second plurality of candidate anomalies may be represented by a series of values within a microprocessor, in which case "overlaying" the first and second pluralities of candidate anomalies is carried out computationally.

A distance is measured 16 from each candidate anomaly of the first plurality of candidate anomalies to each candidate anomaly of the second plurality of candidate anomalies. An average of these distances is determined 18.

The average of the distances may be the constellation match value for the constellation match.

The closer the correlation between the first and second pluralities of candidate anomalies, the lower the average of the distances will be. For example, in the ideal case where each of the candidate anomalies in the first plurality overlay one of the candidate anomalies in the second plurality then all of the distances will be zero and the average of the distances will also be at its lowest value.

At step 19 a candidate count is determined. The candidate count determines the number of candidate anomalies in the second plurality of candidate anomalies (i.e. in the second image) that are within a specified radius of each of the candidate anomalies in the first plurality of candidate anomalies (i.e. in the first image).

In digital images the candidate count may use a radius identified by a number of pixels. For example, the candidate count may determine the number of candidate anomalies of the second plurality that are within a 3×3 square of pixels of each candidate anomaly in the first plurality. The 3×3 matrix of pixels may be centred on the centre of the candidate anomalies of the first plurality.

By determining the number of candidate anomalies of the second plurality that are within a predetermined radius of each candidate anomaly in the first plurality, the method disclosed herein is able to determine the number of anomalies that are caused by contaminants such as dust.

At step 20 the first plurality of candidate anomalies is shifted in x and or y and the method returns to step 16. This is repeated for the number of x and y shifts required to cover a desired search area.

The method disclosed herein may determine a constellation match value and/or determine a candidate count as part of a constellation match. In one exemplary embodiment, the method may determine both of these values.

For example, the candidate count may be used to give an indication of the number of anomalies caused by dust. Each of a plurality of candidate counts may be plotted on a two dimensional search surface as described below. Isolated peaks in the surface may indicate that there are a number of anomalies in the first image that are caused by contaminants such as dust. A peak may be considered isolated if it is a value of ten or more greater than every other peak identified in the search surface.

However, isolated peaks will not necessarily comprise a single candidate count value as the level of the candidate count may be the same or similar for a number of x and/or y shifts of the first image relative to the second image.

Therefore, the constellation match value may be determined to identify the constellation match in which the candidate anomalies of the first plurality of candidate anomalies are closest to the candidate anomalies of the second plurality of candidate images. The constellation match with the lowest constellation match value has been determined at the x and/or y shift value in which the candidate anomalies of the first plurality best overlay the candidate anomalies of the second plurality. Therefore, the corresponding candidate count for the same x and/or y shifts represents the number of anomalies in the first image caused by contaminates such as dust.

Figure 2:
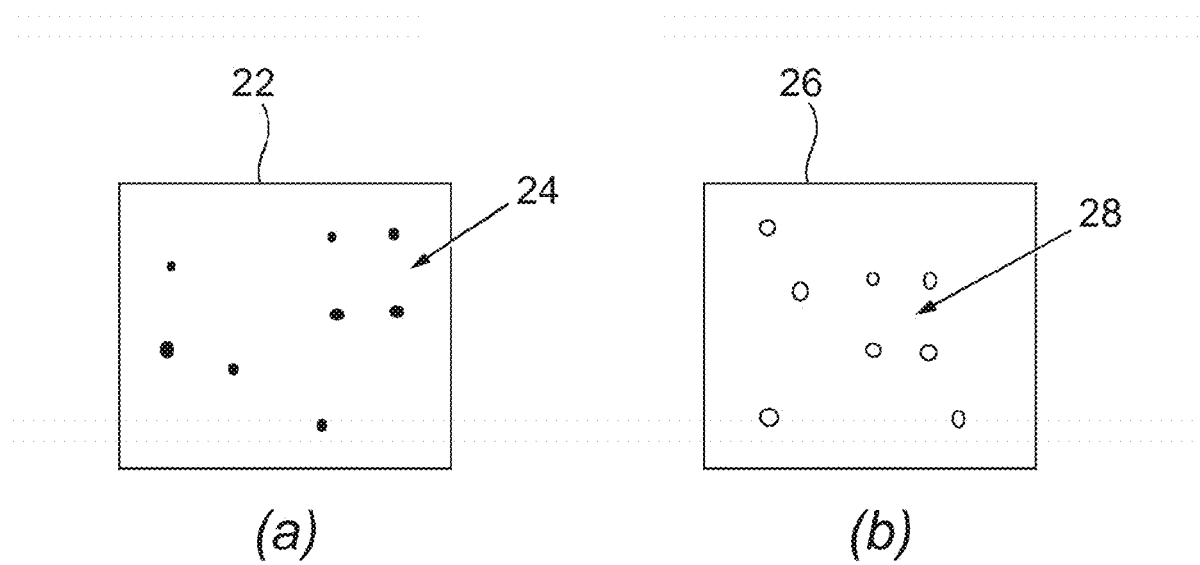
FIG. 2 shows first and second images with identified pluralities of candidate anomalies according to exemplary embodiments of the invention.

Referring to FIG. 2 there is shown two images for each of which four candidate anomalies have been identified. FIG. 2a shows a first image 22 in which a first plurality of candidate anomalies has been identified. FIG. 2b shows a second image 26 in which a second plurality of candidate anomalies has been identified. It can be seen that four of the first plurality of candidate anomalies 24 have the same spatial arrangement as four of the second plurality of candidate anomalies. These are candidate anomalies which the method disclosed herein will identify as anomalies.

The four candidate anomalies 24 in the first image 22 and the four candidate anomalies 28 in the second image 26 are caused by contaminants on the optical surfaces of a retinal imaging scanner. However, they are shifted in x and y between subsequent images. The x-y relative shift of the candidate anomalies between the first and second pluralities of candidate anomalies may be caused by mechanical inaccuracies inherent in an imaging device. Alternatively the x-y relative shift may be caused by electrical timing errors.

Figure 3:
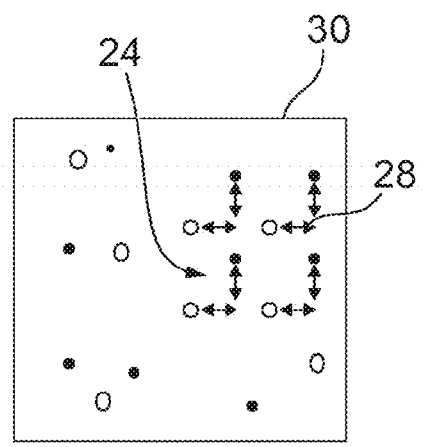
FIG. 3 shows the first and second images of FIG. 2 overlaid according to exemplary embodiments of the invention.

Referring to FIG. 3 the first and second images 22, 26 are shown overlaid in one image 30. The candidate anomalies of both images are shown on the overlaid image 30. The four candidate anomalies 24, 28 of each of the first and second images 22, 26 are shown to be shifted in x and y.

When the constellation match process described above is carried out the constellation match value would be relatively high.

Figure 4:
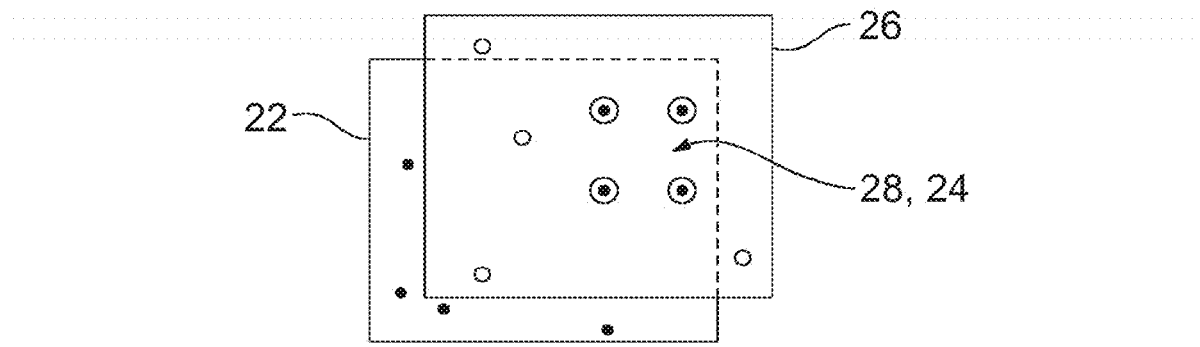
FIG. 4 shows the first and second images of FIG. 2 overlaid and shifted in x and y according to exemplary embodiments of the invention.

Referring to FIG. 4, the first and second images 22, 26 have been shifted as part of the constellation match process. It can be seen that the four candidate anomalies 24, 28 are now overlaid. Such an arrangement will produce a high correlation between the first and second plurality of candidate anomalies. Therefore, the constellation match value (representing an average of the distances between candidate anomalies) would be relatively low.

Figure 5:
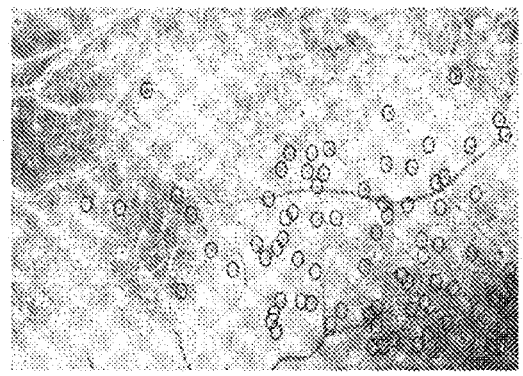
FIG. 5 shows an exemplary retinal image with candidate anomalies identified according to exemplary embodiments of the invention and highlighted using ringing.

The example of the first and second images 22, 26 with identified candidate anomalies described above is greatly simplified for clarity. FIG. 5 shows an exemplary retinal image with candidate anomalies ringed.

As discussed above, the constellation match process covers a required search area. For example, if the images are digital images then the search area may define an area of 10×10 pixels. In other embodiments other sizes and shapes of search area may be defined.

Using the above example, constellation matches may be carried out first of all with the origins of the images overlaid, then with the first plurality of candidate anomalies shifted by one pixel each time to cover the one hundred pixels of the search area. It is noted that the "origin" is a notional common point in that it represents the bottom left hand corner of an image. In digital imagery, the origin may be the pixel in the bottom left corner of the image.

A single constellation match value may be produced for each constellation match that represents the correlation between the first and second pluralities of candidate anomalies with the first plurality of candidate anomalies shifted by a pixel each time. Additionally, a plurality of candidate counts may be produced for each constellation match.

Figure 6:
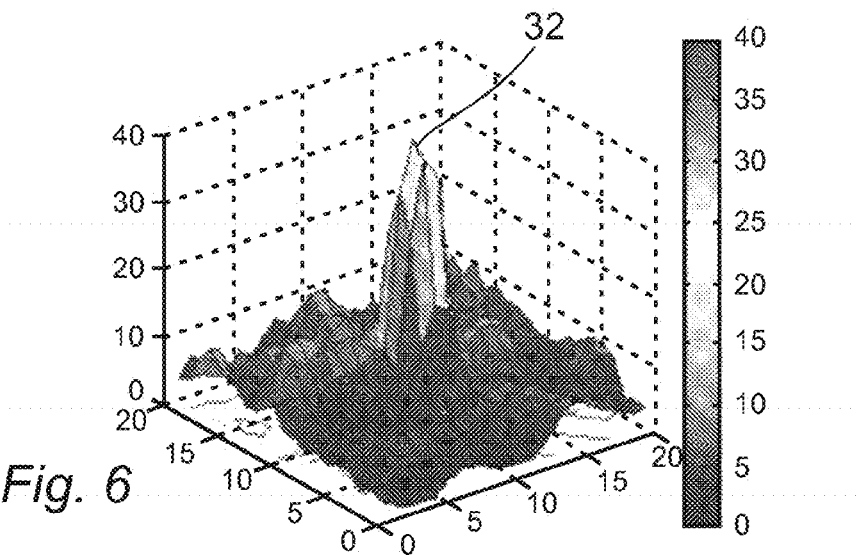
FIG. 6 shows a two dimensional search surface with a single isolated spike identifying a plurality of anomalies according to exemplary embodiments of the invention.
Figure 7:
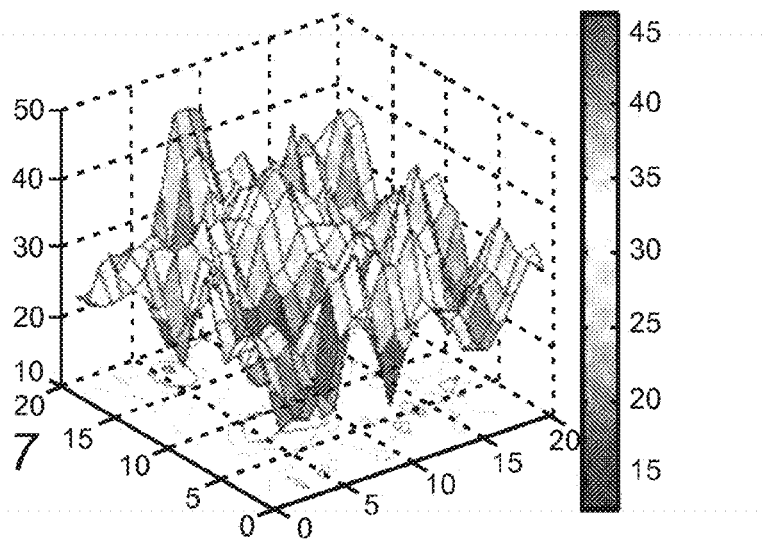
FIG. 7 shows a two dimensional search surface with no isolated spike identifying a plurality of anomalies according to exemplary embodiments of the invention.

The plurality of constellation match values and/or the plurality of candidate counts determined in this way may be represented in a two dimensional search surface. FIG. 6 shows an exemplary search surface where a correlation between the first and second pluralities of candidate has been identified. FIG. 7 shows an exemplary search surface where no correlation between the first and second pluralities of candidate has been identified. FIGS. 6 and 7 show the candidate counts for an image determined as set out above.

Referring to FIG. 6 the peak 32 is characteristic as the basis for determining if common candidate anomalies exist in the first and second pluralities of candidate anomalies. This in turn indicates dust contamination of the optical surfaces of a retinal imaging scanner.

In the case of a single isolated peak a contamination value or dust metric is assigned based on the height of the peak. The height value will give an approximate indicator of the number anomalies in the image that are caused by dust or other contaminants. Confidence in the identification of anomalies using the spike in the search surface is provided from analysis of the uniformity of the remaining search surface. By finding the x-y image shift co-ordinates corresponding to the peak position, the individual particles producing the common count can be mapped to the image to produce the dust map that has good noise performance and does not require an absolute position of anomalies in an image.

Referring to the exemplary search surface of FIG. 7, no single isolated peak can be found in the search space. The algorithm will in this case not identify any anomalies in the image. The algorithm may also return a zero count for anomalies and contaminant particles indicating that the image (and hence the optical surfaces of the device) may be considered clean from contaminants.

Figure 8:
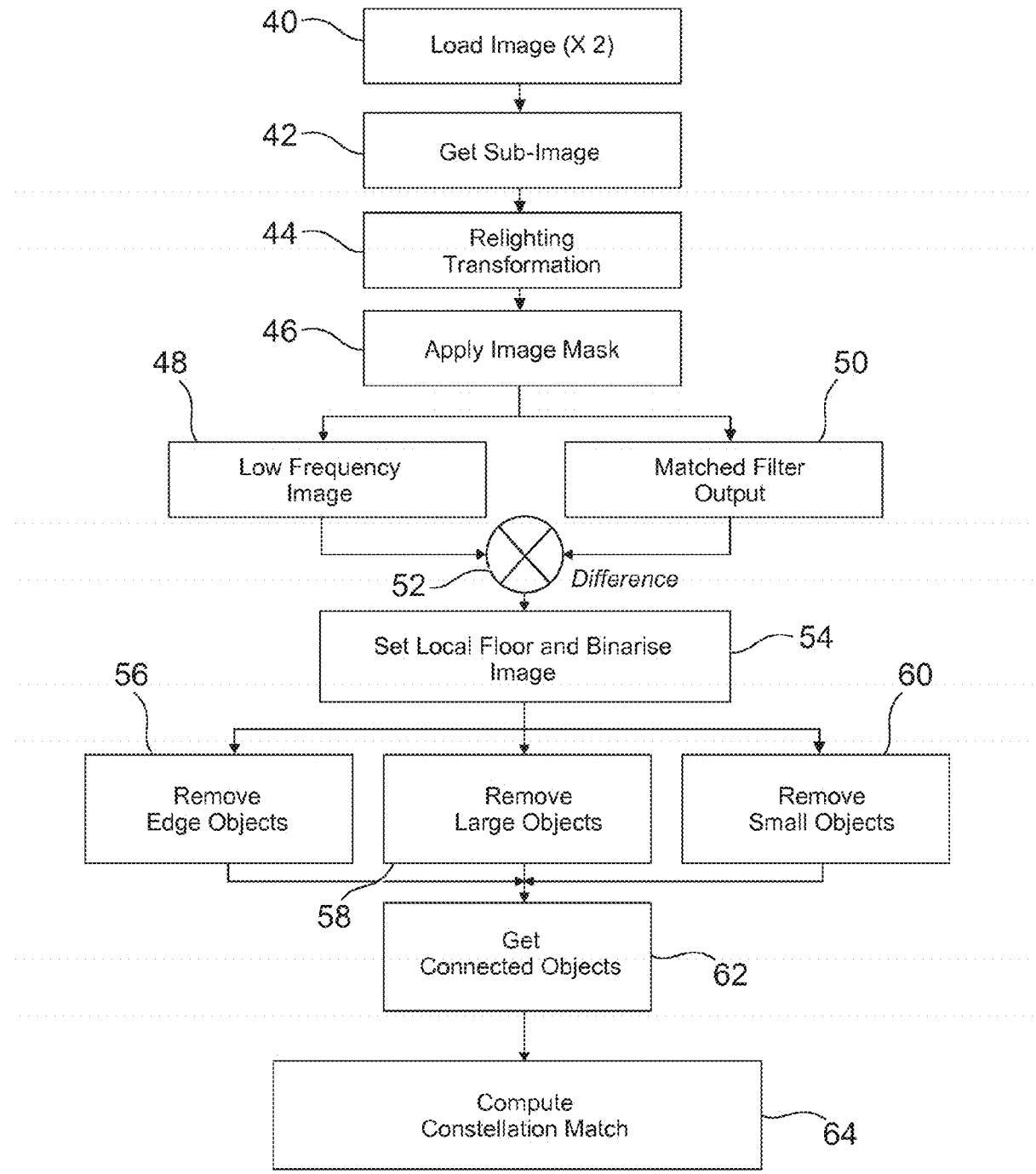
FIG. 8 shows a flow diagram of an exemplary embodiment of the invention.

Referring to FIG. 8 there is shown a flow diagram of an exemplary embodiment of the method disclosed herein including steps relating to the identification of candidate anomalies in images.

Image data corresponding to two sequentially captured images, which may be of different retinas, are loaded 40 into an apparatus comprising a microprocessor configured to run the method described herein.

The image data relating to each image are segmented into four sub-images, for example quadrants of equal dimensions. The quadrants are then processed separately to produce four contamination metrics. The four contamination metrics are summed to produce one contamination metric. The four quadrants are processed individually as described below beginning with the retrieval of a given sub-image 42.

As a pre-process, the image segment may be normalised 44 using a relighting transform to minimise any variation in particulate form between images.

A mask is then applied 46 which zeros image pixels around the periphery of the sub-image. This masking ensures that image features of the sub-image due to the edges of mirrors or lenses within an imaging device, which can sometimes manifest as a broken line of small anomaly features, are not processed by the algorithm. This improves the processing time and also ensures that particle matches due to the close alignment of any mirror edge features between two images are not mistaken for common anomalies.

The masked image is then convolved in parallel with an averaging (smoothing) kernel 48 and an anomaly resonating matched filter kernel 50.

The smoothing kernel 48 produces a low frequency image. Each of the pixel values in a given area of the low frequency image is an average of all of the pixels at a given location within the sub-image equal to the given window size. That is, for a given window size at a given location in the sub-image an average of all the pixels is produced; each of the pixels in the low frequency image corresponding to the given location is given the averaged value.

This matched filter 50 is a block of finite values surrounded by zeros, with a mean of unity, that has been tuned (i.e. varying the relative relationship between finite values and the zeros in the kernel) by trial and error to resonate with the "typical" appearance of an anomaly. That is, the matched filter is a representation of an anomaly. When the matched filter is correlated to the sub-image a correlation value is generated that represents a correlation between an area of the image and the representation of an anomaly. A plurality of correlation values may be determined when the matched filter is passed over the sub-image. Peaks in the correlation values are seen when areas of the image correlate with the matched filter, i.e. when parts of the sub-image might be anomalies. These peaks correspond to candidate anomalies.

When the matched filter output is convolved with the low frequency image the peaks in the matched filter output are reinforced relative to uniform areas of the low frequency image.

The difference 52 between the matched filtered output and the low frequency image is computed to produce an image in which candidate anomaly features have been accentuated and the background (i.e. non candidate anomaly features) has been attenuated. An image threshold is then applied to produce a binary image 54 in which particulate features have been fully isolated from their background. That is, the binary image indicates a "1" where a candidate anomaly is identified and a "0" where no candidate anomaly is identified.

This thresholding is carried out iteratively by indexing the cut-off threshold downwards in single greyscale level steps and counting the number of anomaly points above this threshold on each iteration. The final value for the threshold is found when the number of particles above the threshold exceeds a preset value. The preset value may be for example 1500 candidate anomalies. In this way two images of different contrast ranges and varying intensities can be thresholded to produce approximately the same number of candidate anomalies.

Three separate object filters are then applied. A first filter 56 removes objects around the sub-image periphery corresponding to regions around the mask edges. This is necessary to avoid false-positive candidate anomalies being assigned to pixel clusters that result from fragments in the stepping line structure of the mask boundary.

The large objects filter 58 is then applied to remove objects above a certain upper threshold. The threshold may for example be 160 pixels in area. Objects above the threshold may be the result of fragmentation of the vasculature in a noisy image. When such features are common in an image pair some of them can line-up (even from different retinas) and cause a false positive candidate anomaly.

A third object filter 60 removes all apparent candidate anomalies below a set threshold. The threshold may for example be 3 pixels in area. This is necessary to remove features due to noise, which in a particularly noisy set of images would otherwise cause clusters of false-positive identifications of candidate anomalies.

All objects remaining after steps 56, 58 and 60 are then parameterized 62 to produce a vector of object indexes with references to object size (area in pixels) and the centre co-ordinates of each object (computed as the centre of mass for each object). The vector of objects represents the identified plurality of candidate anomalies for a given sub-image.

Steps 40 to 62 are carried out for each sub-image of each full image, i.e. or two images split into four quadrants that is steps 40 to 60 are carried out eight times.

A constellation match 64 is then generated as described above. The constellation match is determined from the sets of parameterized objects (i.e. the candidate anomalies) from two sequential images. The sequential images may be of different retinas since an image pair of the same retina may produce an inaccurate match along the boundary of common blood vessels within the retina.

The constellation match may be represented as a two dimensional surface of distance measures representing the centre of each object to the centre of all the other objects for a range of x-y relative image shifts. The range of x-y image shifts may for example be +/−10 pixels from a notional origin. Alternatively, the search surface may comprise the candidate counts for each x-y relative image shift.

In embodiments of the method disclosed herein a computer program product may be configured to store computer program code to execute the method described herein. The computer program product may for example comprise a computer hard drive, a floppy disc, CD, DVD, flash memory or other data media. The computer program product may alternatively or additionally comprise programmable logic, ASICs and/or firmware.

In other embodiments of the method disclosed herein an apparatus such as a computer or computing device may comprise a microprocessor configured to carry out the method described herein. The apparatus may also be located within an imaging device.

Figure 9:
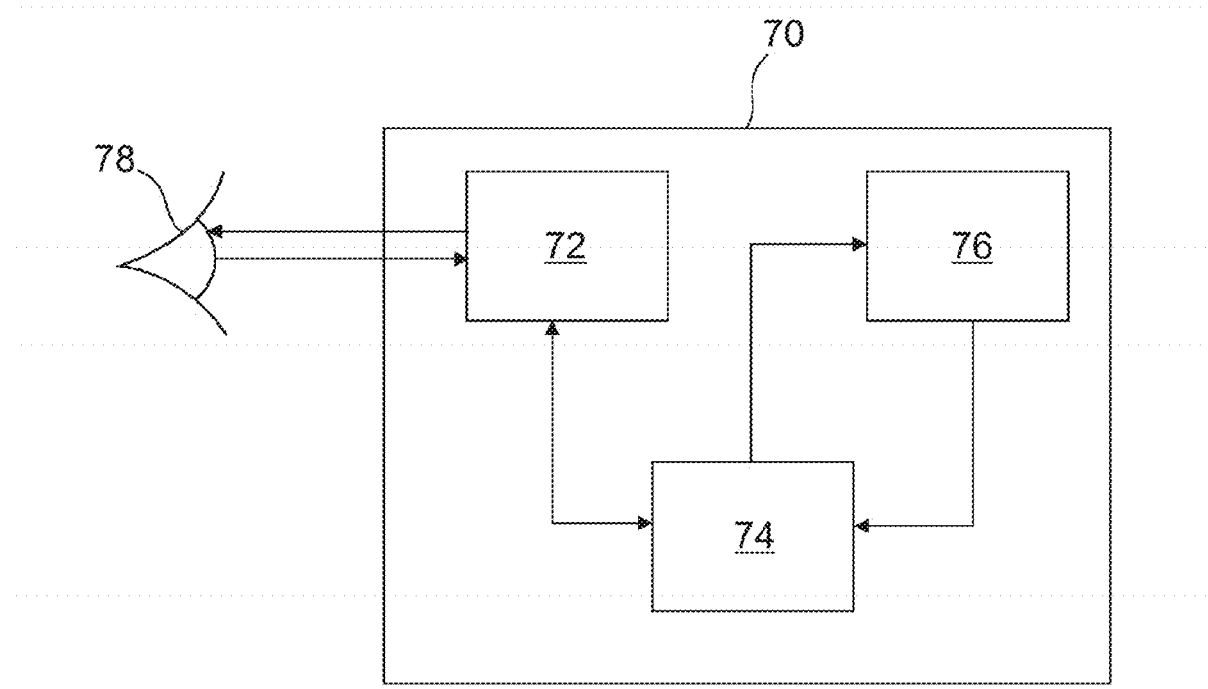
FIG. 9 shows an apparatus according to exemplary embodiments of the invention.

Referring to FIG. 9 an apparatus 70 configured to carry out the method disclosed herein is shown. In this exemplary embodiment the apparatus 70 comprises optical hardware 72, a microprocessor or similar computing device 74 and a memory 76. The optical hardware 72 is connected via an electrical link to the microprocessor 74. The microprocessor is in turn connected to the memory 76 via two electrical links. The apparatus 70 may be a scanning laser ophthalmoscope.

The optical hardware may in some embodiments include lenses and mirrors configured to carry out laser imaging of a retina. The optical hardware may transmit a laser into an eye 78 and receive back a reflected signal. The reflected signal comprises raw image data that may be used to construct an image of the retina within the eye 78.

The optical hardware may be configured to transmit the raw image data to the microprocessor 74 where the image data may be processed to produce an image of a retina. The microprocessor may be configured to transmit the retina image to the memory 76 where it is stored. This process may be repeated throughout the day with different subjects to build a number of retina images stored within memory 76.

In some exemplary embodiments at least two subsequent retina images may be transmitted from the memory 76 to the microprocessor 74 to carry out the method as disclosed herein. The microprocessor may then identify anomalies in the retina images that may be caused by contaminants, such as dust, in or on the optical hardware.

The level of the spike mentioned above that may be output by the constellation match may be used as a contamination or dust metric. The level of the spike may therefore correspond to the amount of contaminant on the optical surfaces of an imaging device. A user of an imaging device may therefore use the level of the contaminant metric to decide when an engineer is called out to clean the optical surfaces of an imaging device or to conduct other maintenance. In other embodiments of the method disclosed herein, the level of the output from the constellation match may be automatically monitored at a remote location. For example, a manufacturer of imaging devices may monitor all field units and organise a maintenance team based on which units require cleaning or maintenance at which times.

In exemplary embodiments of the method disclosed herein, to increase confidence in the contamination metric the method disclosed herein may be carried out on all subsequent images taken during a day. In this way the method provides for monitoring of imaging units without the need to take images especially for that purpose.

The skilled person will identify further embodiments without departing from the scope of the invention as claimed.

The invention claimed is:

1. A method of identifying anomalies in images produced using an imaging device, the method comprising:
    identifying a first plurality of candidate anomalies in a first image produced using the imaging device;
    identifying a second plurality of candidate anomalies in a second image produced using the image device; and
    running a constellation match between the first plurality of candidate anomalies and the second plurality of candidate anomalies to identify a plurality of anomalies from a first plurality of candidate anomalies and a second plurality of candidate anomalies, such that the identified plurality of anomalies comprises at least two of the first plurality of candidate anomalies that have the same relative spatial arrangement as at least two of the second plurality of candidate anomalies.

2. The method according to claim 1, wherein the relative spatial arrangement of the candidate anomalies comprises a distance from a centre of each candidate anomaly in the first or second plurality of candidate anomalies to the centre of all other candidate anomalies in the same plurality of candidate anomalies.

3. The method according to claim 1, wherein the running comprises:
    correlating the first plurality of candidate anomalies with the second plurality of candidate anomalies; and
    determining a constellation match value representing a level of correlation between spatial arrangements of the first plurality of candidate anomalies and the second plurality of candidate anomalies.

4. The method according to claim 3, wherein the determining comprises measuring a plurality of distances from a centre of each candidate anomaly of the first plurality of candidate anomalies to the centre of each candidate anomaly of the second plurality of candidate anomalies and averaging the plurality of distances.

5. The method according claim 1, wherein the running comprises determining a candidate count representing a number of candidate anomalies in the second plurality of candidate anomalies within a predetermined radius of each candidate anomaly of the first plurality of candidate anomalies.

6. The method according to claim 3, comprising determining a plurality of constellation match values and a plurality of candidate counts, each constellation match value and candidate count being determined after shifting the first plurality of candidate anomalies in at least one of an x direction and a y direction relative to the second plurality of candidate anomalies.

7. The method according to claim 6, comprising identifying a plurality of anomalies in the first image and the second image in dependence on at least one of the plurality of candidate counts being greater than a predetermined threshold.

8. The method according to claim 7, wherein the predetermined threshold is determined in dependence on a relative value of the plurality of candidate counts.

9. The method according to claim 1, comprising identifying the first plurality of candidate anomalies in the first image produced using the imaging device and identifying the second plurality of candidate anomalies in the second image produced using the imaging device.

10. The method according to claim 9, wherein the identifying the first plurality of candidate anomalies and the second plurality of candidate anomalies comprises running a matched filter on each of the first image and the second image.

11. The method according to claim 10, wherein the running comprises correlating a representation of an anomaly to an area of at least one of the first image and the second image and determining a correlation value representing a level of correlation between the first image and the second image.

12. The method according to claim 11, wherein the determining comprises determining a difference between a light level of at least one area of the representation of the anomaly and a light level of a corresponding overlaid area of at least one of the first image and the second image.

13. The method according to claim 12, comprising identifying a candidate anomaly of at least one of the first plurality of candidate anomalies and the second plurality of candidate anomalies in dependence on a correlation value being greater than a predetermined threshold.

14. The method according to claim 13, comprising determining a plurality of candidate anomalies by determining a plurality of correlation values, each correlation value being determined after shifting the representation of the anomaly in at least one of an x direction and a y direction relative to the image.

15. The method according to claim 1, comprising producing the first image and the second image using the imaging device.

16. A computer program product comprising a non-transitory computer-usable medium having computer-readable program code embodied therein, the computer-readable program code adapted to be executed to implement a method comprising:

identifying a first plurality of candidate anomalies in a first image produced using an imaging device;
identifying a second plurality of candidate anomalies in a second image produced using the imaging device; and
running a constellation match between the first plurality of candidate anomalies and the second plurality of candidate anomalies to identify plurality of anomalies from a first plurality of candidate anomalies and a second plurality of candidate anomalies, such that the identified plurality of anomalies comprises at least two of the first plurality of candidate anomalies that have the same relative spatial arrangement as at least two of the second plurality of candidate anomalies.

17. An apparatus comprising a processor configured to carry out the method according to claim 1.

18. An imaging device comprising the apparatus according to claim 17.

* * * * *